United States Patent [19]

Vanaschen et al.

[11] Patent Number: 5,053,069
[45] Date of Patent: Oct. 1, 1991

[54] PROCESS AND DEVICE FOR BENDING AND TEMPERING BY CONTACT

[75] Inventors: Luc Vanaschen, Eupen, Belgium; Hans-Werner Kuster, Aachen, Fed. Rep. of Germany; Benoit D'Iribarne, Essex, Great Britain; Hans-Josef Prömper, Aachen, Fed. Rep. of Germany; René Gy, Villemomble, France

[73] Assignee: Saint-Gobain Vitrage International, Courbevoie, France

[21] Appl. No.: 542,086

[22] Filed: Jun. 22, 1990

[30] Foreign Application Priority Data

Jun. 22, 1989 [FR] France .................... 89 08310

[51] Int. Cl.⁵ ........................................... C03B 23/033
[52] U.S. Cl. ............................. 65/106; 65/115; 65/288; 65/349

[58] Field of Search ................. 65/107, 103, 115, 114, 65/288-290, 106, 349

[56] References Cited

U.S. PATENT DOCUMENTS

| | | | |
|---|---|---|---|
| 4,229,201 | 10/1980 | Comperatore et al. | 65/290 X |
| 4,508,556 | 4/1985 | Bennett et al. | 65/106 X |
| 4,557,745 | 12/1985 | Halberschmidt et al. | 65/106 X |
| 4,609,391 | 9/1986 | McMaster | 65/106 X |
| 4,826,522 | 5/1989 | d'Iribarne et al. | 65/351 X |
| 4,865,638 | 12/1989 | Kudo | 65/289 X |

Primary Examiner—Robert L. Lindsay
Attorney, Agent, or Firm—Oblon, Spivak, McClelland, Maier & Neustadt

[57] ABSTRACT

Glazings are preshaped before putting them through a step of tempering by contact. In a preferred variant, tempering by contact is applied only the central area of the glazing and the marginal zone thereof is tempered by blowing cold air.

19 Claims, 4 Drawing Sheets

PROCESS AND DEVICE FOR BENDING AND TEMPERING BY CONTACT

BACKGROUND OF THE INVENTION

1. Field of the Invention

This invention relates to bending and tempering by contact of glass sheets, particularly for the production of glazings intended, for example, for motor vehicles, such glazing requiring a very great shape precision, fragmentation (upon breaking) according to safety standards, and an optical quality satisfying the strictest standards.

2. Description of the Related Art

It is known, for example, from patent application EP-A-277074 to simultaneously bend and temper glass sheets which have previously been heated beyond their plastic deformation temperature, by bringing them between two cooling and compression plates whose form corresponds to the curve that it is desired to impart to the glass sheet. The glass sheets are pressed between the plates until their temperature is low enough for their shape to remain fixed. Such a process is particularly advantageous for the glazings of thin glass, for example of less than 3 mm of thickness, in which it is difficult to bring them after bending to a high enough temperature for a heat tempering; this is because of the quickness of their cooling in air as soon as the glazings of thin glass come out of the heating furnace.

Another reason for developing such processes of bending-tempering by contact is the need for a perfect control of the curve of a glazing, particularly the elimination of the so-called defects of double-bending, i.e., undesired curves, due to the effects of gravity when the glass sheet is not supported at every point of its lower face.

The present inventors have observed a slight divergence of the form of the glass sheet relative to that of the cooling and compression plates, whose origin is partially due to the incomplete relaxation of the bending stresses. These bending stresses are maximal in the vicinity of the surfaces of the glass, i.e., they are maximal at the locations cooled most quickly and therefore for which the period during which the relaxation of the stresses can actually occur is minimal. Further, the nonrelaxation of the stresses can cause localized tensions which are greater than the resistance of the glass, and so the breaking of the glazing.

It is possible to extend this period during which this relaxation can occur by beginning with glass sheets whose initial temperature is higher and which therefore undergo a cooling of greater intensity. However, there exists in terms of optical quality a limit to the initial heating of the glass sheet. If the glass sheets are transported flat on rollers—which is the mode of transport which is the simplest, the most economical and for the most part the least likely to cause marks or smears in the enamel—glass which is too hot has a slight tendency to sag between the rollers, which creates defects of the "corrugated sheet" type whose trace persists even after pressing during the stage of bending-tempering by contact.

Further, with bending-tempering by contact, it is practically impossible to extend the shaping phase by, for example, gradually folding the bending forms, because the shaping time must be considered if the glass sheet simultaneously undergoes an intense cooling by the cooling and compression plates. The use of suitable buffer materials supplies a solution to this problem, but only with respect to the usual pressing speeds for tempering by contact. Actually, if the assigned shaping time is too long, a breakage occurs at the end of the shaping, because the glass is then too cold to support the deformation rate. This limiting of the shaping time causes a limiting of the curves able to be imparted by this process. Moreover, extending the shaping phase reduces the operating speed of the production line, which is always a defect for an industrial use.

On the other hand, many processes of production of bent and tempered glazings are known in which these two operations are performed in separate times and places, particularly processes according to which the glass sheets are heated in a horizontal position in a furnace through which they are conveyed, for example by a conveyor formed by rollers, then are lifted above the conveyor by mechanical or pneumatic means—particularly by suction or by blowing hot air—applied against a flat upper element or one constituting a bending form, and then released on a lower element, for example a ring open at its center, which guides the glass sheet to a heat tempering device which blows cold air via tempering boxes. Depending on the case, the shaping of the glass sheet is performed exclusively or partially by the lower element, or it is already finished when the glass sheet is deposited on the lower element.

Processes also are known which do not use a lower element —or which use one only for the bending stage- —and according to which the transfer of the bent glass sheet to the tempering device is performed directly on the upper form which then is moving, or on a conveyor formed from an optionally curved roller bed. To these processes of bending-tempering using an upper element and the vertical movement of the glass sheet, it also is necessary to add the bending processes according to which the glass sheet is advanced on a shaping bed consisting, for example, of markers or rods mounted straight on a curved path. All the processes mentioned above are well-known in the art and examples of them can be found in patent publications US-A3,527,589, EP-A-3391, EP-A-5306, FR-A-2085464, FR-A-2312463, FR-A-2442219, FR-A-2549464, FR-A-2549465, FR-A-2554436, FR-A-2567508, FR-A-2596750, FR-A-2596751.

These processes make it possible to reach very high speeds even for relatively complex glazing forms. However, if priority is always given to the optical quality, it is practically impossible to obtain perfect conformity with the form and particularly to prevent the double-bending defect. It is necessary to note that the divergences of the form are all the more appreciable when the thickness of the glass sheet is slight, which explains the increased advantage of processes of bending-tempering by contact for thin glass.

SUMMARY OF THE INVENTION

This invention has as a first object an improvement in the processes of bending-tempering by contact such which makes it possible to obtain, under industrial conditions, glazings exhibiting all types of curves, particularly of small radii of curvature, and with a very great precision of form.

According to the invention, the object is achieved by use of a preshaping operation in a hot environment, before beginning the operation of bending-tempering by contact. By hot environment, it is meant that the preshaping should be conducted under such conditions that the temperature of the glass sheets is equal to their bending-tempering temperature when they are conveyed between the cooling and compression plates.

Advantageously, in all the directions of the glass sheet, the preshaping step results in the divergence between the curve of the glass sheet and the final curve desired for the glass sheet, at every point of the glass sheet, to be less than 1 m$^{-1}$. The curve at a given point of the glass sheet is equal, by definition, to the inverse of the radius of curvature at this point. In other words, whatever the chosen form may be, the operation of bending-tempering by contact can be performed at the same rate as the bending-tempering operation for a plane glass sheet to which a radius of curvature of at least 1 meter is to be imparted. The preshaping therefore comes close to the final curve at the locations where the small radii of curvature are located. It thus can be performed in an extremely quick way, without being concerned about the possible formation of parasitic curves since these will be corrected during the pressing phase of the operation of bending-tempering by contact, while making absolutely sure not to induce optical defects during the preshaping phase or during the phase of transfer to the device for bending-tempering by contact.

This later phase of correcting the curve gives a very great flexibility to the process according to the invention. If the divergence between the curves is always less than 1 m$^{-1}$, for example, it does not matter much whether the glass sheet loses, during the transfer, a little of the curve which was imparted to it during the preshaping—or acquires an additional curve from it. As a result, the transfer can be achieved by a conveyor with an air-cushion (which cannot cause optical defects), a roller conveyor or a wire mesh conveyor consisting of a flexible belt formed from a fabric, or a knit of heat-resistant metal fibers and exhibiting a resistance to the passage of the heat measured perpendicularly to the plane of the belt between $0.25 \times 10^{-3}$ and $5 \times 10^{-3}$ m$^2 \times$K$\times$W$^{-1}$, said flexible belt being placed between the glass sheet and the lower compression and cooling plate.

As a substitute for these conveyors, shaping elements used for preshaping also can be used directly, whether this is a shaping bed gradually providing a curve to the glass or whether these are elements against which the glass sheet is applied, particularly male or female pressing forms which are solid or consist of open rings in their center. As a general rule, the pressing elements—which are joined to means providing mechanical or pneumatic forces—are preferred according to the invention—because they are well-suited for obtaining small radii of curvature. The pressing by an upward current of hot air is preferred, but a "pressing by suction" can also be had, i.e. where the glass sheet is laid against the upper element by a suction created, for example, in the vicinity of the periphery of the glass sheet or close to the surface of said upper element.

Of all the processes listed above, special mention should be made of those which, in the final state of bending and therefore of preshaping, bring the glass sheet to an annular support on which the edges of the glass sheet rest. In these cases, there is no danger of the central part of the glass sheet—which after the mounting of the glazing on a vehicle is most often the only part visible—being marked. Moreover, it is known that if the glazings are coated with a layer of enamel, the latter always is turned toward the inside of the vehicle, i.e., the side which the least exposed to bad weather; in other words, the enamels—which during the bending are partially in the molten state with a high risk of smears—are on the concave face of the glazing and not on its convex face which rests on the annular support. Further, this annular frame can be used to transfer the glass sheets from the preshaping device to the device for bending-tempering by contact—as is known for the heat tempering processes with boxes blowing cold air, with in the particular case of the invention, the advantage of giving a very great precision of the position of the glass sheet relative to the cooling and compression plates, a precision which is one of the conditions for obtaining glazings perfectly in accordance with the desired form.

As indicated previously, an essential aspect of the preshaping before the bending-tempering operation is the possibility of reducing, in all the cases, the deformation that the glass undergoes between the cooling and compression plates to a deformation corresponding to a curve of less than 1 m$^{-1}$. It thus is possible to obtain glazings of any radius of curvature, while in the absence of preshaping the minimum radii of curvature are close to 0.85 mm—or even larger for a higher optical quality.

As a corollary, this preshaping makes possible a significant reduction of shaping time between the cooling and compression presses, and by that an increase of the production speed, particularly by allowing an acceleration of the pressing rate if the bending phase can be brief.

Another important advantage is that it is possible to proceed to the stage of bending and tempering by contact with glass sheets whose initial temperature is relatively low, which limits to the maximum the risks of formation of optical defects. By a low temperature, a temperature lower than 650° C. and preferably lower than 630° C. is meant here, but of course the temperature must be beyond the plastic deformation temperature of the glass sheet to be able to give the complementary curve.

Further, the process according to the invention is particularly well-suited to one of the modes of use described in patent application EP-A-277074 which was already cited, namely the one according to which a bending-tempering by contact is performed by cooling plates smaller than the glass sheets. The choice of proceeding in such a way is particularly advantageous in the case of glazings of large dimensions, because with increasing dimensions of the glazings, the design of suitable formed cooling plates increasingly gives rise to difficulties. Further, it becomes increasingly difficult to produce the necessary uniform compression pressure and to evacuate the increasing amounts of heat by the cooling of said plates. Moreover, this preferred process makes possible the use of a transfer frame for the glazing which remains in place during the tempering by contact.

Another well-known difficulty to which the cooling and compression plates, smaller than the glass sheet, can provide a satisfactory remedy is that posed by the glazings whose marginal areas are covered by enamels intended to form an opaque layer forming a framing and masking, for example the adhesive used for the mounting of the glazing on the vehicle. It goes without saying that the difficulties described in detail above in reference to preshaping are identical and the advantage of proceeding with cooling and compression plates which do not cover these enameled marginal zones is, from this point of view, perfectly obvious.

The major defect of the technique taught by EP-A-277074 is, of course, the fact that the outside part of the glazing is not subjected to compression and therefore is not bent directly. Also, provided that the outside parts represent only a fairly small fraction of the surface and that the viscosity of the glass is not too low, the stiffness of the glass is enough for these zones to follow at least partially the curve imparted to the central part. With shaping according to the process according to the invention, it becomes possible to provide the desired curve even to these marginal zones, without danger of damaging the enameled parts and/or smearing the cooling plates by the enamels.

It can be advantageous to preshape such enameled glazings by using a ring-shaped support which is used as a pressing form and/or a transfer tool to the bending-tempering device comprising cooling and compression plates smaller than the glass sheets—and joined with this device, a device for blowing cold air on the marginal zones of the glazing. It can be operated with a frame which exhibits a discontinuous support surface for the glass sheet, for a better exhaust of the blown cold air—which gives greater importance to the quality of the tempering—or with a continuous frame—which is synonymous with a better optical quality if the defects which can be generated during the optional pressing during the preshaping phase are thus prevented. The frame then is evacuated just before proceeding to blow along the marginal zones.

In a strict sense, the notion of preshaping according to the invention applies only in the case of the production of glazings exhibiting a nonzero curve. However, one of the numerous advantages of the preshaping is that it makes it possible to optimize the surface temperatures of the glass sheets. Actually, the present inventors have found that this notion can be extended, to a certain extent, even to the case of plane glazings. It has been found that any asymmetry, even small, between the temperatures of the two opposite faces of the glass sheet is enough to cause, after tempering, a certain divergence relative to the expected form, the side initially the coldest becoming the convex side of the glazing. The preshaping becomes, from this point of view, very advantageous, either for imparting an inverse curve which will be compensated for during the operation of tempering by contact, or more simply for constituting only a single phase of heat conditioning the glass sheet. The furnaces often used have, for example, a tendency to heat the upper face of the glass sheet more than the lower face which is partially hidden by the rollers which support the glass. Therefore an effort can be made to compensate for the temperature difference between the faces by a specific heat input reserved for the lower face, an input which can be obtained, for example, by an upward hot air current exerting a uniform dynamic pressure. The same production line thus can be used for all the glazing types.

As is explained above, most bending devices known in the art are suitable for using the invention. A production line designed for the process according to the invention therefore is formed essentially of a furnace, a "hot" bending station without tempering cooling, a station for bending-tempering by contact, and means of transfer of the glass sheets between the two bending devices.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE DRAWINGS

Figure 1:
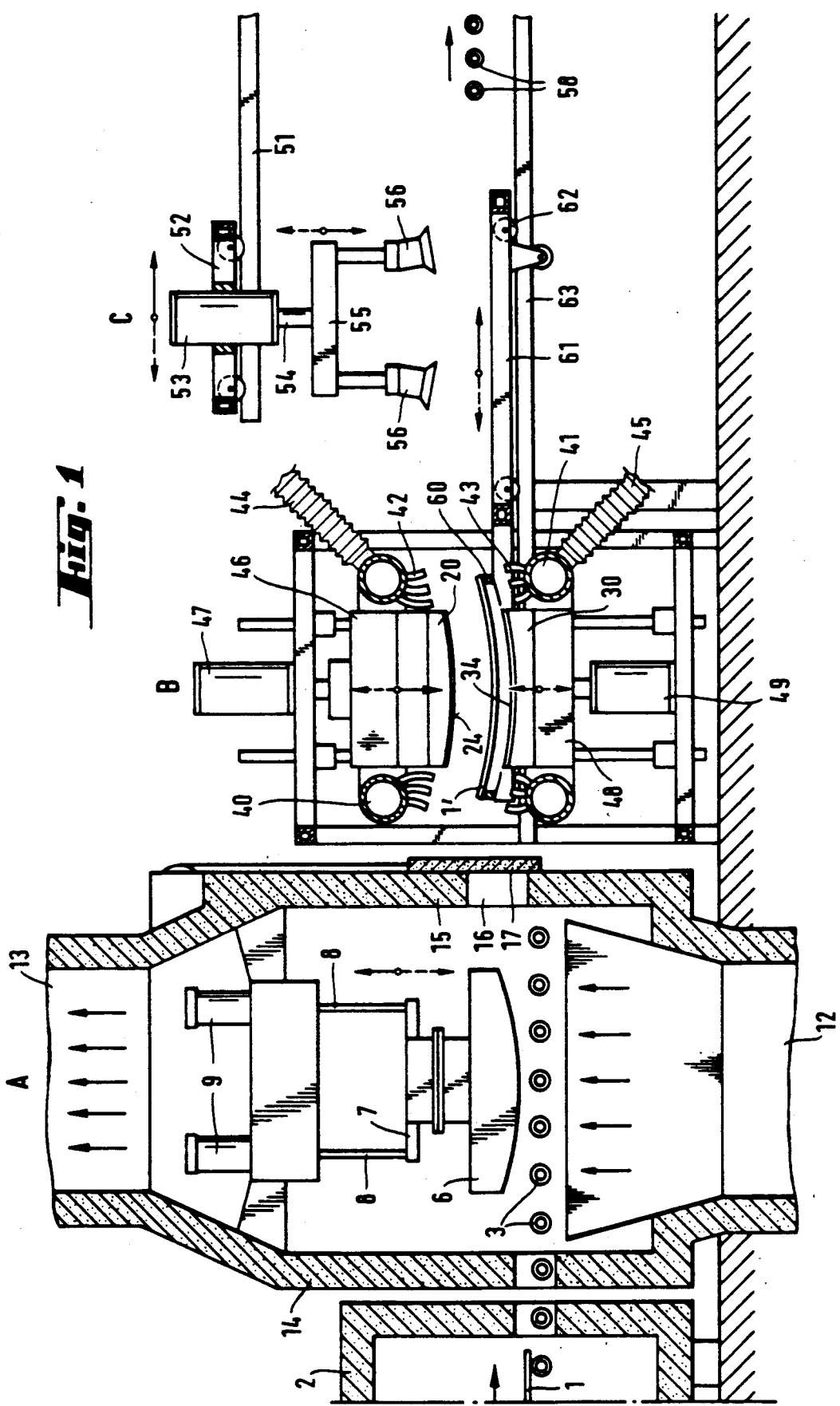
FIG. 1 is a general diagrammatic outlay of a bending and tempering installation according to the invention.
Figure 2:
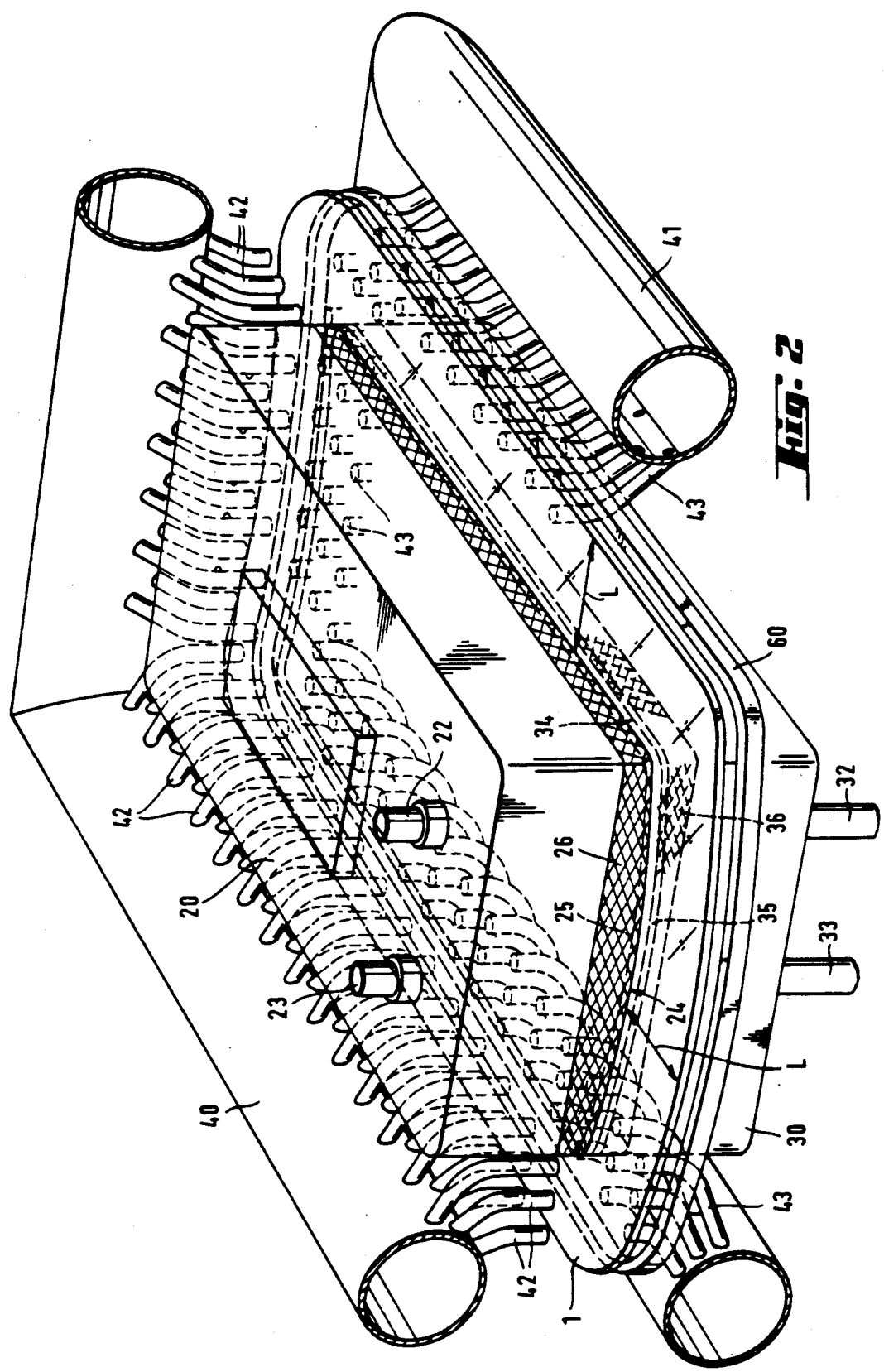
FIG. 2 is a perspective view of the essential elements of a compression and tempering station according to the invention.
Figure 3:
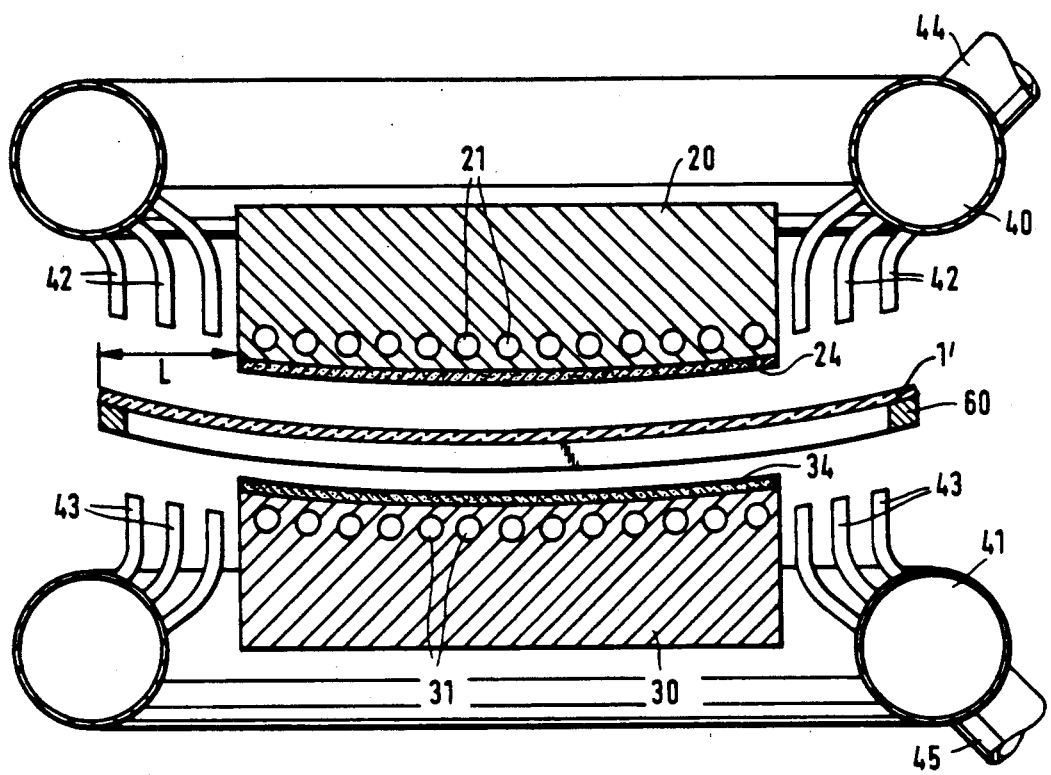
FIG. 3 is a view of the compression and tempering station at the time of the positioning of the present glazing.
Figure 4:
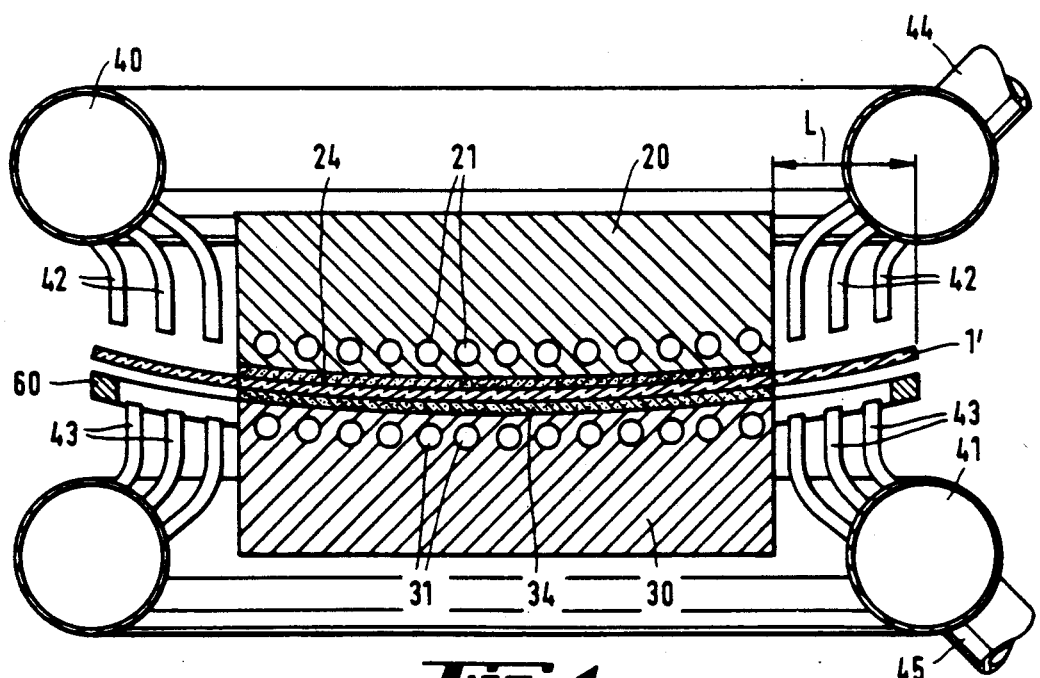
FIG. 4 is a view of the compression and tempering station at the time of the compression and tempering operation.

An installation for the execution of the process according to the invention comprises, as FIG. 1 shows diagrammatically, essentially has three stations, namely a bending station A, a compression and tempering station B, and an evacuation station C.

Glazings 1 to be bent are heated to the bending temperature in a continuous furnace 2 in a known manner. With a conveyor consisting, for example of driven rollers 3, the heated glazings are transported through furnace 2 to bending station A where the preshaping is initiated.

In the case shown, the bending operation is performed in bending station A by the hot air bending process known from US-A4,682,997. Bending station A comprises for this purpose a convex solid upper bending form 6 installed above rollers 3. Bending form 6 is attached to a frame 7, mounted on rods 8 which can be moved vertically via suitable driving devices 9, so that bending form 6 can be brought into the lowered position shown in the drawings, and also into a raised position. Below rollers 3 is provided a feed pipe 12 by which hot air is directed according to a predetermined volume flow and under a predetermined pressure, so that the upward hot air current is directed toward upper form 6. After having passed through the bending chamber, the hot air current goes out through pipe 13 and then is recycled to duct 12.

By the flow of hot gas, glazing 1 is pressed against the molding surface of bending mold 6 and thus takes the shape which is predefined by the latter. The bending chamber itself is surrounded by an enclosure 14. Wall 15 of enclosure 14 has an opening 16 which is closed by a door 17 during the bending operation.

Compression and tempering station B comprises a convex upper mold 20 cooled, for example, with water, and a concave lower mold 30 which also cooled. Two molds 20 and 30 define a surface smaller than that of glazing 1'. The two molds are surrounded by annular ducts, respectively marked 40 and 41 for the distribution of cold air. Ducts 40, 41 respectively include blowing nozzles 42, 43 directed toward the marginal areas of glazing 1'. Ducts 40 and 41 are fed air by cold blowing feed hoses 44 and 45.

Upper mold 20 is installed together with annular duct 40 on a frame 46 whose vertical position is controlled by a pneumatic or hydraulic cylinder 47. Likewise, lower mold 30 is installed together with annular duct 41 on a common frame 48, whose vertical position is controlled by a pneumatic or hydraulic cylinder 49.

Transfer station C essentially comprises a carriage 52 which moves on rails 51 parallel to the direction of transport axis of the glass sheets. Carriage 52 carries a pneumatic cylinder 53. A frame 55, on which suction cups 56 are suspended, is attached to the rod of piston 54 of cylinder 53. With this transfer device, the glazings are grasped, after tempering, by suction cups 56, lifted and deposited on a roller transporter conveyor 58. This roller conveyor 58 transports the glazings over such a postcooling distance that the glazings are at room temperature at the end of conveyor 58.

The transfer of glazing 1' from bending station A to transfer station C is performed by an annular frame 60 corresponding to the shape of the bent glazing. Frame 60 is mounted on a carriage 61 equipped with wheels 62 which travel on rails 63 parallel to rails 51.

Figure 5:
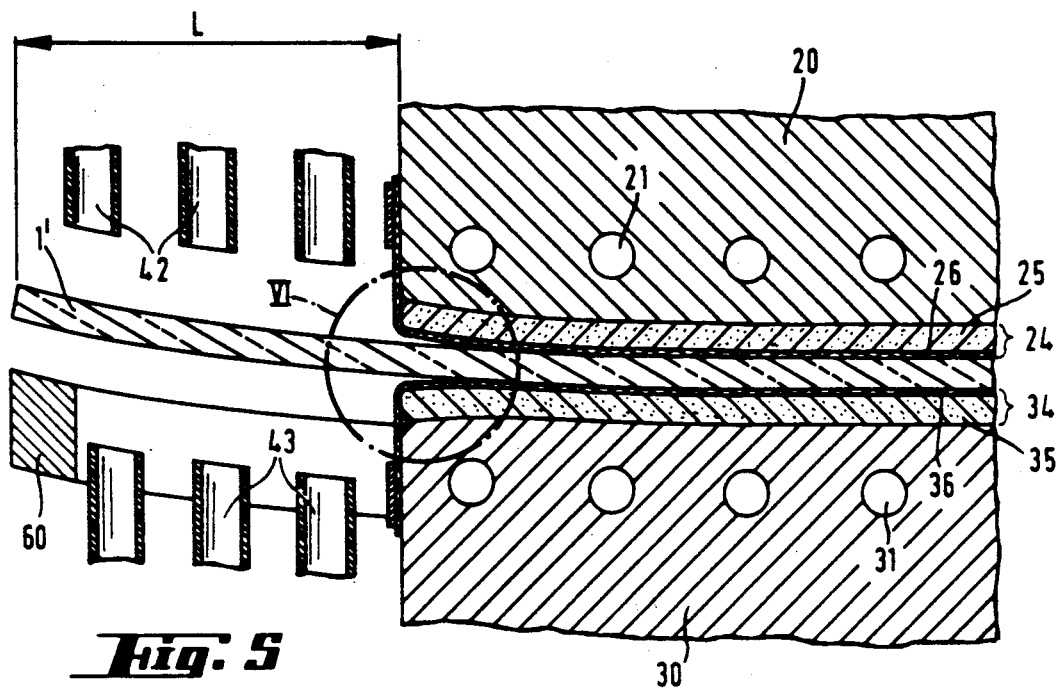
FIG. 5 is a view in section illustrating the structure of the cooled bending tools.
Figure 6:
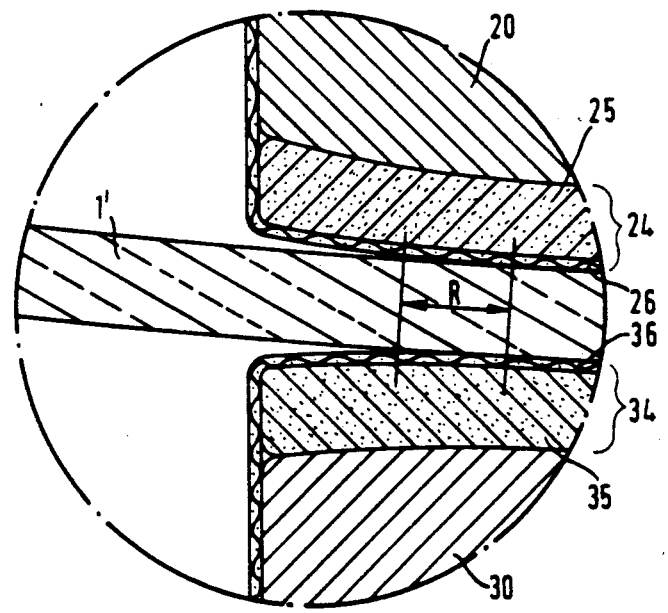
FIG. 6 is a view, in larger scale, of one part of FIG. 5.

The design of compression and tempering tools and their mode of operation are seen from FIGS. 2 to 6. Upper mold 20, which simultaneously provides the compression and the abrupt cooling of the central zone for the tempering of glazing 1', consists of a metal body equipped with pipes 21 through which the cooling water passes. Any material with a low value of linear thermal expansion coefficient ratio, particularly graphite as indicated in patent application EP-A-312441, can be used to produce the cooling plates. The cooling water is admitted by a hose 22 and evacuated by hose 23. On the molding surface itself, mold 20 is equipped with a layer 24. Layer 24 is made of a material which has an elastic deformability sufficient for it to be applied in an optimal manner by its entire surface to the surface of the glass, and which has good heat conductivity properties. Layer 24 can, for example, be made of a flake graphite plate of about a 1 to 2 mm thickness, available under the trademark SIGRAFLEX (registered trademark of SIGRA GMBH according to the law of the Federal Republic of Germany). As FIGS. 5 and 6 show, this flake graphite plate 25 is covered and held by a thin metal gauze 26 which for its part is attached to the side walls of mold 20. Metal gauze 26 also consists of a metal having a suitable heat conductivity—as is indicated in above-mentioned patent application EP-A-312441—and which has a small thickness of, for example, between 0.1 to 0.3 mm.

Lower mold 30 is designed in a similar manner. It also is equipped with pipes 31 through which cooling water passes. The cooling water is admitted by hose 32 and evacuated by hose 33. The surface of the metal body of compression mold 30 is equipped with an elastically flexible layer 34 which is made of a flake graphite plate 35 covered with a metal gauze 36.

Molds 20 and 30 have an extended surface which is less than that of glazing 1' to such an extent that width L of the marginal area of the glazing laterally projects beyond the molds by 1 to 10 cm. In this marginal area, glazing 1' is tempered by cold air jets coming out from blowing nozzles 42 and 43.

To prevent deformations of glazing 1' at the edge of molds 20 and 30, the molding surfaces of the molds have at their edges a radius of curvature different from that of glazing 1', as FIGS. 5 and 6 clearly show. The compression pressure thus always is lowered to zero in a transition area. R, which rules out any risk of deformation of the glazing in this location. Further, as is evident from FIG. 4, during the compression and tempering operation itself, glazing 1' is lifted slightly from molding frame 60, so that molding frame 60 transmits, during this operation, no possibly disturbing force to glazing 1'.

Glazing 1' is lifted from molding frame 60 by lower mold 30 which is raised by cylinder 49. As a variant or as an addition, molding frame 60 also can be mounted moving upward and downward, so that glazing 1' can be deposited on lower mold 30 by lowering molding frame 60 and so that, when glazing 1' has been picked up by lower recompression mold 30, molding frame 60 becomes separated from glazing 1' by an additional lowering.

The process executed with the device described above takes place in the following manner.

Glazing 1 heated to the bending temperature enters bending chamber 14. During this time, opening 16 is closed by door 17. Bending mold 6 occupies its lower end position in which it is a little above the transport plane of the glass sheets. The glazing is positioned below bending mold 6. The hot air current by which the glazing is pressed against the bending surface of bending mold 6 then is engaged.

While maintaining the hot air current, the bending mold is moved to its upper position with glazing 1'. At the same time, door 17 is opened which frees the path of annular frame 60 which until this moment was outside the bending chamber. Carriage 61 carrying annular frame 60 moves in the direction of the bending chamber until frame 60 is exactly below glazing 1' held against bending mold 6 by the hot air current. Bending mold 6 now is moved in the direction of annular frame 60, and the volume flow of the hot air current is reduced to the point that glazing 1' becomes detached from bending mold 6 and is deposited on annular frame 60.

As soon as glazing 1' has become separated from bending mold 6, the latter again is moved upward and annular frame 60 carrying bent glazing 1' is introduced into compression and tempering station B. The slight deformation of glazing 1', which inevitably occurs during the transport of the hot bent glazing and which is due to the sagging of the glazing in its central zone under the effect of its own weight, now is corrected in the compression and tempering station. Immediately after the positioning of frame 60 between cooling and compression molds 20 and 30, these molds are moved toward one another so that glazing 1' is lifted slightly from molding frame 60 by the lower mold. By the pressurized contact with two cooled molds 20 and 30, glazing 1' acquires its final shape in its central zone and simultaneously is tempered thermally by the quick cooling. At the same time, air distribution ducts 40 and 41 are fed cold air, so that the marginal area also is cooled quickly and thus tempered.

As soon as the cooling operation is finished, the two cooling and compression molds 20 and 30 are brought back to their initial position. In this way, the glazing is freed. Carriage 61 with glazing 1' now is brought into transfer station C where the glazing is lifted from molding frame 60 and is deposited on roller transporter 58.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. Process of bending and tempering a glass sheet, comprising the steps of:
   preshaping a heated glass sheet in a hot environment; and bending and tempering the preshaped glass sheet by contact with two compression and cooling plates whose form corresponds to the desired curve to be imparted to the glass sheet,
   wherein said preshaping step is such as to impart to the glass sheet a curve such that in all directions in the plane of the glass sheet, the curve imparted to the glass sheet by the preshaping step is such that a divergence between the desired curve and the curve imparted by the preshaping step is less than 1 $m^{-1}$.

2. Process according to claim 1, wherein the glass sheet is in a substantially horizontal position during said preshaping step and said bending and tempering step.

3. Process according to claim 1, wherein the temperature of the glass sheets after the preshaping step is less than 630° C.

4. Process of claim 1, wherein said preshaping step comprises using a shaping element to shape the glass step in a preshaping station, including the step of using said shaping element to transfer the preshaped glass sheet to a bending and tempering station.

5. Process according to claim 4, wherein said shaping element is a ring-shaped frame.

6. Process according to claim 1, wherein said preshaping step comprises pressing the glass sheet onto a shaped form.

7. Process according to claim 6, wherein the pressing step included applying an upward hot air current to the glass sheet.

8. Process according to claim 6, wherein the pressing step comprises applying suction to the glass sheet.

9. Process according to claim 1, wherein the preshaping step comprises advancing the glass sheet on a shaping bed.

10. Process according to claim 1, wherein said bending and tempering step comprises leaving marginal zones of the glass sheet projecting beyond the compression and cooling plates, and blowing cold air jets onto said marginal zones.

11. Process according to claim 10, wherein the marginal zones each have a width of 1 to 10 cm.

12. Process according to claim 1 wherein said glass sheet has a decorative edge printed with a baking enamel.

13. Device for bending and tempering a glass sheet, comprising:
    a furnace for heating a glass sheet;
    a preshaping station having means for preshaping the heated glass sheet in a hot environment;
    a bending and tempering station having means for bending and tempering a glass sheet by contact with two compression and cooling plates whose form corresponds to the desired curve to be imparted to the glass sheet; and
    transfer means for sequentially transferring the glass sheet from the furnace to the preshaping station and the bending and tempering station.

14. Device according to claim 13, wherein said preshaping means include an annular ring for receiving a bent glass sheet, and a movable carriage supporting said annular ring, and wherein said bending tempering means comprise compression and cooling plates comprising two cooled molds having dimensions smaller than those of the glass sheet, and blowing nozzles placed beside said molds for directing cooling air on marginal zones of the glass sheets which project laterally beyond the molds, and an air distribution duct for feeding cold air to the blowing nozzles.

15. Device according to claim 14, wherein said cooled molds include internal cooling pipes and, on surfaces of said molds turned toward the glass sheet, an elastically flexible layer with high heat conductivity.

16. Device according to claim 15, wherein said elastically flexible layer is made of a plate of 1 to 2 mm thickness of flaky graphite and a metal gauze covering the graphite plate.

17. Device according to claim 14, wherein said molds have, at ends thereof, a radius of curvature different from that of the glass sheets, whereby compression forces exerted on the glass sheet are reduced to zero at said ends.

18. Device according to claim 14, wherein the surface area of said molds is less than that of the glass sheet to such an extent that a marginal zone of the glass sheet having a width of 1 to 10 cm projects laterally beyond the molds.

19. Device according to claim 14 wherein said molds are flat so as to produce flat glazings.

* * * * *